United States Patent
Kojima

(10) Patent No.: US 7,436,353 B2
(45) Date of Patent: Oct. 14, 2008

(54) TRANSMITTING-RECEIVING MODULE OF RADAR SYSTEM

(75) Inventor: Haruo Kojima, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 35 days.

(21) Appl. No.: 11/509,765

(22) Filed: Aug. 25, 2006

(65) Prior Publication Data

US 2007/0115170 A1    May 24, 2007

(30) Foreign Application Priority Data

Sep. 7, 2005    (JP) .............................. 2005-259687

(51) Int. Cl.
*G01S 7/02* (2006.01)
*G01S 13/00* (2006.01)

(52) U.S. Cl. ........................... 342/175; 342/82; 342/89; 342/198

(58) Field of Classification Search ........... 342/82–103, 342/175, 195, 198, 147, 157, 158, 361–377, 342/165–174, 205
See application file for complete search history.

(56) References Cited

U.S. PATENT DOCUMENTS

| | | | | |
|---|---|---|---|---|
| 2,935,743 | A | * | 5/1960 | Glegg .......................... 342/84 |
| 3,761,924 | A | * | 9/1973 | McGowan ................... 342/198 |
| 4,725,842 | A | * | 2/1988 | Mayberry ................... 342/198 |
| 4,792,805 | A | * | 12/1988 | Miglia ........................ 342/372 |
| 5,270,719 | A | * | 12/1993 | Roth ........................... 342/361 |
| 5,446,464 | A | * | 8/1995 | Feldle ......................... 342/175 |

FOREIGN PATENT DOCUMENTS

JP    2004-153653    5/2004

OTHER PUBLICATIONS

"Receiver Protector Technology"; no author listed; no date given; CPI Wireless Solutions, Beverly Microwave Division; Beverly, Massachusetts, U.S.A.*
M.I. Skolnik, "Introduction to Radar Systems"; McGraw-Hill Book Company; New York; Second Edition, 1980; p. 365, section with the heading "Circulator and receiver protector."*

* cited by examiner

*Primary Examiner*—Bernarr E Gregory
(74) *Attorney, Agent, or Firm*—Oblon, Spivak, McClelland, Maier & Neustadt, P.C.

(57) ABSTRACT

A transmitting-receiving module of a radar system which is an embodiment of the present invention, includes, a transmitting circuit for sending transmitting RF signal, a three terminal circulator having three terminals and with the first terminal of which is connected a transmitting-receiving antenna, a first RF switch which is connected with the second terminal of the three terminal circulator and the output can be switched over, a second RF switch with input which can be switched over, an attenuator connected between the first RF switch and the second switch, and a receiving circuit connected with the output terminal of the second RF switch, when radar signal is being transmitted, the first RF switch is connected with the attenuator, and the second RF switch is not connected with the attenuator, when radar signal is being received, the first RF switch is connected with the second RF switch directly or connected through a low noise amplifier.

8 Claims, 3 Drawing Sheets

TRANSMITTING-RECEIVING MODULE OF RADAR SYSTEM

CROSS-REFERENCE TO RELATED APPLICATIONS:

The present application claims the benefit of the Patent Application number 2005-259687 filed in Japan on Sep. 7, 2005, the entire contents of which are incorporated herein by reference.

BACKGROUND OF THE INVENTION (1) Field of the Invention

The present invention relates to a radar system, and especially relates to a construction of a receiving system of a transmitting-receiving module used for radar system.

(2) Description of the Related Art

In radar system, objects in the transmission direction of radio wave are detected by transmitting radio wave and receiving the reflected wave. In one type of radar systems, a phased array radar system, which detects objects in a predetermined range by changing the transmitting and receiving direction by changing phases of transmitting and receiving radio wave, is known.

In the radar system of this sort, it is necessary to provide a number of transmitting-receiving modules for transmitting and receiving radio wave.

The transmitting-receiving module used in the phased array radar system had a circuit configuration, for example, shown in FIG. 1. Namely, an antenna 1 for transmitting and receiving is connected with an A terminal of a three terminal circulator 2, an output of transmitting system power amplifier 3 is connected with a C terminal of the circulator 2, an A terminal of an RF switch 4 is connected with a B terminal of the circulator 2. And, a B terminal of the RF switch 4 is connected with an A terminal of an RF switch 5, a C terminal is connected with a terminating resistance 6 respectively.

And, a B terminal of the RF switch 5 is connected with a B terminal of an RF switch 7, a C terminal with a fixed attenuator 8 respectively, another terminal of the fixed attenuator 8 is connected with a C terminal of the RF switch 7. And, an A terminal of the RF switch 7 is connected with an input of a low noise amplifier 9, signal amplified by the low noise amplifier 9 is signal processed for example so as to be visual displayed in normal receiving circuit 10.

Operation of a conventional transmitting-receiving module having a circuit configuration mentioned above, is as follows. First, when in transmission, by connecting all of the RF switches 4, 5, 7 with C terminal side, reflected wave from antenna to the low noise amplifier 9 is minimized to prevent the low noise amplifier 9 from destruction.

Next, when receiving radar signals, by connecting all of the RF switches 4, 5, 7 with B terminal side, a maximum gain mode is obtained. Further, if an excessive receiving signal is supplied when receiving radar signal, the receiving circuit 10 detects it, and prevents saturation of the low noise amplifier 9 by connecting the RF switch 4 with B terminal side, the RF switch 5, 7 with C terminal side.

However, there was a problem that because in the above-mentioned transmitting-receiving module, three RF switches are connected in series from circulator 2 to low noise amplifier 9, so, noise figure of receiving system becomes high by the insertion loss of three RF switches.

BRIEF SUMMARY OF THE INVENTION

The present invention was performed to overcome the problem that in the conventional transmitting-receiving module mentioned above uses three RF switches to cause degradation of noise figure in receiving system owing to the insertion loss of three RF switches. The present invention aims to supply a transmitting-receiving module capable of improving the noise figure while maintaining the function of the receiving system of the transmitting-receiving module, and further, make it possible to miniaturize the circuit itself.

In an aspect of the present invention, a transmitting-receiving module of a radar system including a transmitting circuit which supplies transmitting RF signal, a three terminal circulator having three terminals, a first terminal is connected with a transmitting and receiving antenna which outputs transmitting RF signal which is outputted from the transmitting circuit and receives receiving RF signal which is a reflected wave of the transmitting RF signal, signal received by the transmitting and receiving antenna is outputted to a second terminal, outputting to a third terminal the signal inputted to the second terminal, a first RF switch which is connected with the second terminal of the three terminal circulator and the output of which can be switched over, a second RF switch the input of which can be switched over, an attenuator connected between the first RF switch and the second switch, a receiving circuit connected with the output of the second RF switch, when transmitting a radar signal, the first RF switch is connected with the attenuator, the second RF switch is not connected with the attenuator, when receiving a radar signal, the first RF switch is connected with the second RF switch directly or through a low noise amplifier, can be supplied.

In another aspect of the present invention, a transmitting-receiving module of a radar system which can improve the noise figure while maintaining the function of a receiving system of a transmitting-receiving module, at the same time make it possible to miniaturize the circuit itself, can be obtained.

DETAILED DESCRIPTION OF THE INVENTION

Hereinafter, embodiments of the present invention will be explained referring to the figures.

First Embodiment

Figure 2:
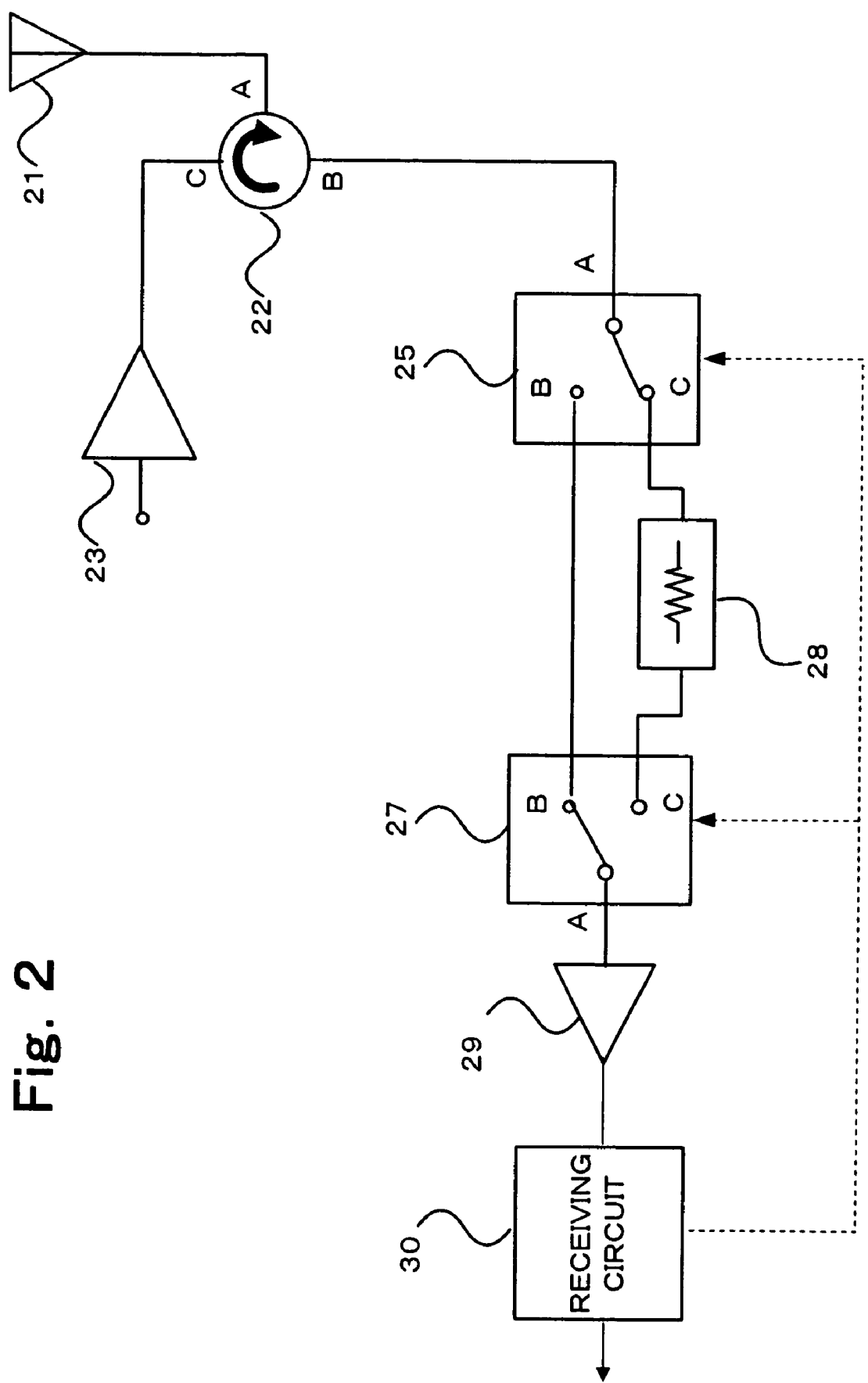
FIG. 2 is a figure showing an example of a circuit configuration of a transmitting-receiving module according to a first embodiment of the present invention.

An example of a circuit configuration of a transmitting-receiving module according to a first embodiment of the present invention is shown in FIG. 2.

The transmitting-receiving module is composed of a three terminal circulator 22 connected with a transmitting-receiving antenna 21, a transmitting system power amplifier 23, a 1-input 2-output RF switch 25, a 2-input 1-output RF switch 27, a fixed attenuator 28, a low noise amplifier 29, and a receiving circuit 30.

B terminal, which is one output terminal of the RF switch 25, is connected with B terminal which is one input terminal of RF switch 27, while, C terminal which is another output terminal of RF switch 25, is connected with one terminal of the fixed attenuator 28, another terminal of the fixed attenuator 28 is connected with C terminal which is another input terminal of the RF switch 27.

The three terminal circulator 22 has A terminal, B terminal, and C terminal, the operation is as follows; signal inputted in A terminal is outputted from B terminal, signal inputted in B terminal is outputted from C terminal, signal inputted in C terminal is outputted from A terminal.

The transmitting-receiving antenna 21 is connected with A terminal (first terminal) of the three terminal circulator 22, C terminal (third terminal) of the three terminal circulator 22 is connected with an output terminal of the transmitting series power amplifier 23, B terminal (second terminal) of the circulator 22 is connected with A terminal which is an input terminal of the RF switch 25.

Next, operation of a transmitting-receiving module according to the first embodiment of the present invention will be explained. When transmitting a radar signal, output from the transmitting series power amplifier 23 of the transmitting circuit is supplied to the three terminal circulator 22 and outputted from A terminal and a transmitting RF signal is transmitted from the transmitting-receiving antenna 21 as a radar transmitting signal.

When transmitting radar signals, the output terminal of the RF switch 25 is connected with C terminal side, the input terminal of the RF switch 27 is connected with B terminal side.

And, undesired reflection component in antenna generated when transmitted from the transmitting-receiving antenna 21 is outputted from B terminal of the three terminal circulator 22, enters into the fixed attenuator 28 from A terminal of the RF switch 25 through C terminal, and is consumed here and is attenuated.

Undesired RF component which is not attenuated in the fixed attenuator 28 is transmitted to C terminal of the RF switch 27, here, because the C terminal is not connected with A terminal, it is reflected here, returns to the fixed attenuator 28 and is attenuated here again. Therefore, the fixed attenuator 28 attenuates the undesired reflection component of transmitted time twice. For example, the fixed attenuator 28 has an attenuation amount of −10 dB and an impedance of 50Ω. In this situation, undesired reflection signal is attenuated by 10 dB while being transmitted from the RF switch 25 to the RF switch 27, and is further attenuated by 10 dB when reflected at C terminal of the RF switch 27.

Figure 1:
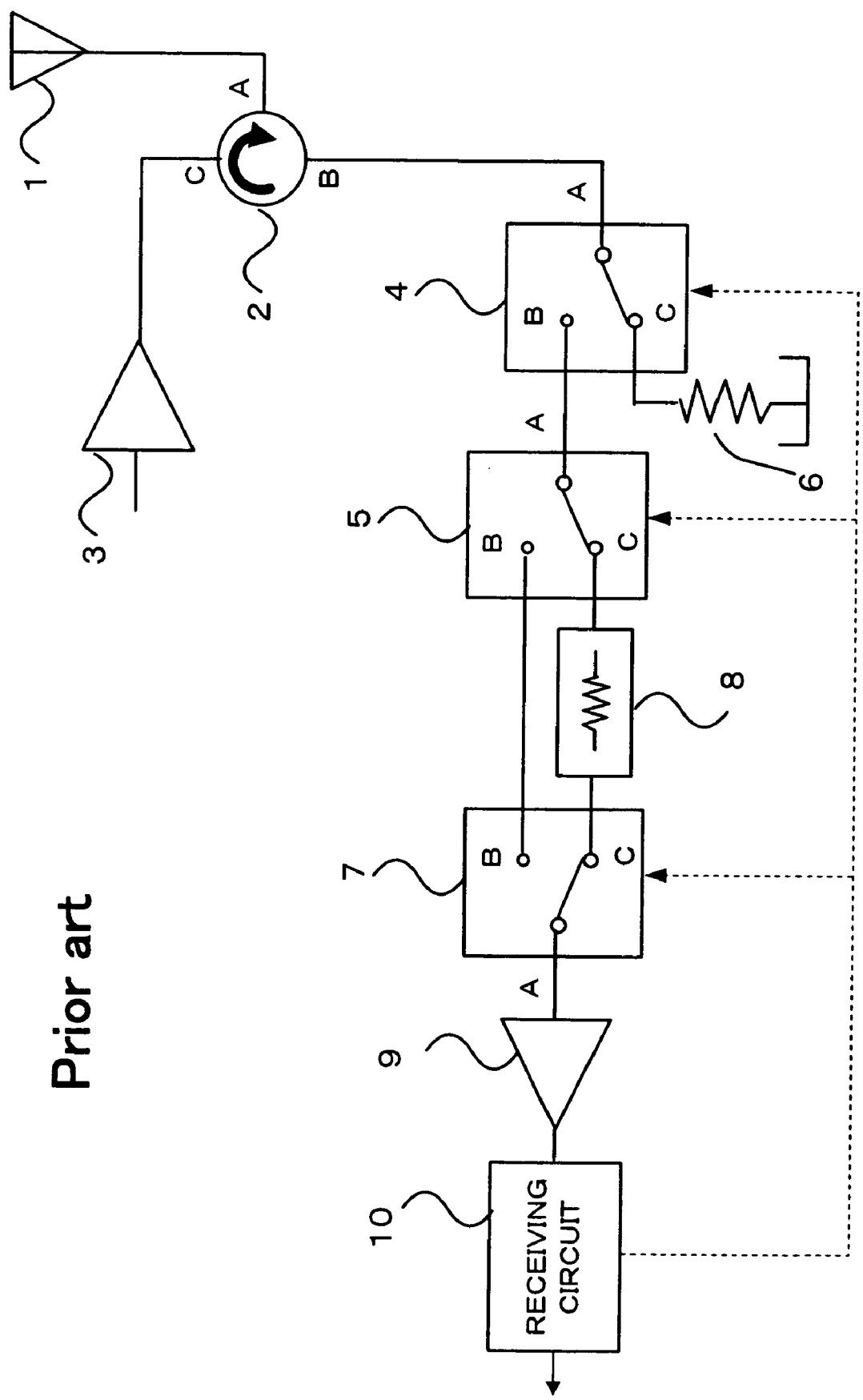
FIG. 1 is a figure showing an example of a circuit configuration of a conventional transmitting-receiving module.

On the contrary, in the conventional case shown in FIG. 1, the undesired reflection signal is attenuated only once by the fixed attenuator 8. Therefore, the attenuation amount of the fixed attenuator is needed to be about 20 dB in order to attenuate the input of the low noise amplifier to a comparable level.

In this way, by attenuating the undesired reflection component entering into the low noise amplifier 29, destruction can be avoided.

On the other hand, while receiving, receiving signal received by the transmitting-receiving antenna 21 is inputted from A terminal of the three terminal circulator 22 and outputted from B terminal, receiving RF signal is sent to RF switch 25. The output terminal of the RF switch 25 is connected with B terminal side, the input terminal of the RF switch 25 is connected with B terminal side. By this configuration, RF signal received by the transmitting-receiving antenna 21 is inputted from A terminal of the three terminal circulator 22 and outputted from B terminal, and is sent to the low noise amplifier 29 through B terminal which is an output terminal of RF switch 25, through B terminal of the RF switch 27.

Receiving RF signal amplified by the low noise amplifier 29 is inputted to the receiving circuit 30, and is signal processed in receiving circuit 30 for example for visual display.

And, while receiving radar signal, receiving signal is gradually growing larger, signal inputted in the receiving circuit 30 becomes large as the target of the radar approaches the radar and finally reaches to saturated state. Therefore, a function for detecting excessively large receiving signals, is provided.

When such an excessively large receiving signal enters in A terminal of the three terminal circulator 22, the receiving circuit 30 detects it and controls the RF switches 25, 27. Namely, output terminal of the RF switch 25 is connected with C terminal side, input terminal of the RF switch 27 is connected with C terminal side. By this situation, receiving RF signal enters into the fixed attenuator 28 from RF switch 25, and is attenuated, is outputted from A terminal of RF switch 27, is inputted in the receiving circuit 30 through the low noise amplifier 29. In this embodiment, signal processed by the receiving circuit 30 is amplified by the low noise amplifier 29 arranged on the previous step, however, there is scarcely no problem if attenuation in the fixed attenuator 28 is enough.

As mentioned above, the transmitting-receiving module according to the embodiment of the present invention can decrease the number of RF switch which lies between the circulator 22 and the low noise amplifier 29 to two with maintaining receiving system function. The decrease of RF switch contributes greatly to improvement of noise figure, besides it makes possible of miniaturizing the whole circuit because one RF switch and terminating resistance become unnecessary compared with the conventional one.

And, loss of receiving system can be improved by 0.5 dB by eliminating one RF switch, assuming loss of an RF switch is 0.5 dB.

Second Embodiment

Figure 3:
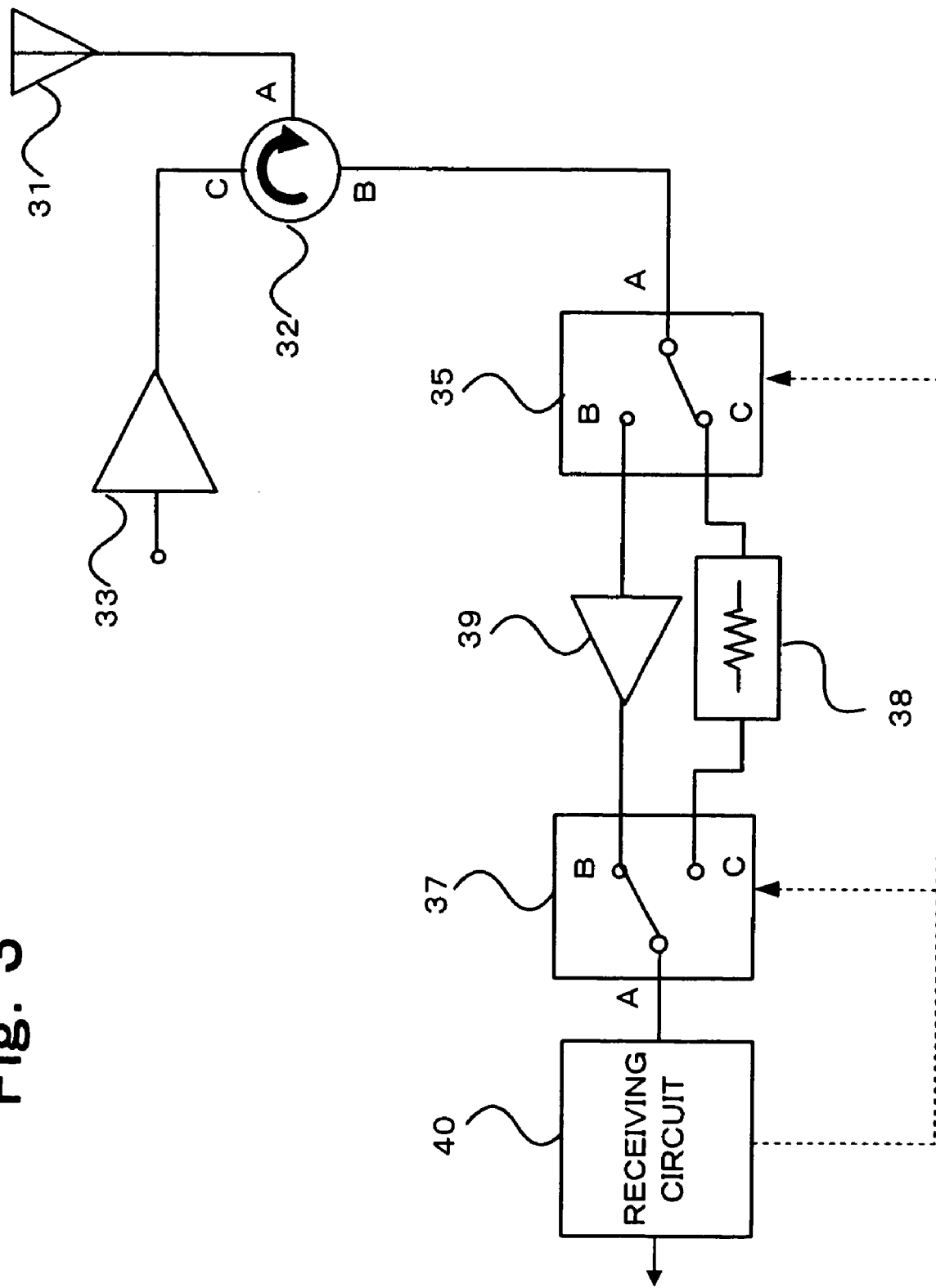
FIG. 3 is a figure showing an example of a circuit configuration of a transmitting-receiving module according to a second embodiment of the present invention.

An example of a circuit configuration of a transmitting-receiving module according to a second embodiment of the present invention is shown in FIG. 3.

The transmitting-receiving module is composed of a three terminal circulator 32 connected with a transmitting-receiving antenna 31, a transmitting system power amplifier 33 included in transmitting circuit, 1-input 2-output RF switch 35, a fixed attenuator 38, a low noise amplifier 39, and a receiving circuit 40.

B terminal, which is one output terminal of the RF switch 35, is connected with an input terminal of the low noise amplifier 39, while, C terminal, which is another output terminal of that is connected with one end of the fixed attenuator 38. Output terminal of the low noise amplifier 39 is connected with B terminal which is one input terminal of RF switch 37, another terminal of the fixed attenuator 38 is connected with C terminal which is another input terminal of RF switch 37.

The three terminal circulator 32 is provided with A terminal, B terminal, and C terminal, and the operation is as follows; signal inputted into A terminal is outputted from B terminal, signal inputted into B terminal is outputted from C terminal, signal inputted into C terminal is outputted from A terminal.

The transmitting-receiving antenna 31 is connected with A terminal (first terminal) of the three terminal circulator 32, C terminal (third terminal) of the three terminal circulator 32 is connected with an output terminal of the transmitting series power amplifier 33, B terminal (second terminal) of the circulator 32 is connected with A terminal of the RF switch 35.

Next, operation of the transmitting-receiving module according to the second embodiment of the present invention is explained. When transmitting radar signal, output of transmitting system power amplifier 33 included in transmitting circuit is inputted into the three terminal circulator 32 and is outputted from A terminal, and transmitting RF signal is transmitted from the antenna 31. Receiving signal received by antenna 31 is inputted into A terminal of the three terminal circulator 32 and is outputted from B terminal, receiving RF signal is sent to RF switch 35. When radar signal is being transmitted, output terminal of RF switch 35 is connected with C terminal side, input terminal of RF switch 37 is connected with B terminal side.

In this situation, unwanted reflected component which is generated in transmitting cycle when transmitted from the transmitting-receiving antenna 31 is outputted from B terminal of the three terminal circulator 32, enters into the fixed attenuator 38 and is consumed here to attenuate.

Unwanted RF component which did not attenuate in the fixed attenuator 38, is supplied to C terminal of RF switch 37, is reflected here, because this C terminal is not connected with A terminal, and returns to the fixed attenuator 38 again and is attenuated here again. Therefore, the fixed attenuator 38 attenuates the unwanted components at transmittance twice. The fixed attenuator has, for example, an attenuation of −10 dB and an impedance of 50Ω. At this time, unwanted reflected signal attenuates by 10 dB while traveling from RF switch 35 to RF switch 37, and further attenuates by 10 dB when reflected by C terminal of RF switch 37. In this way, destruction is prevented by attenuating unwanted reflected component entering into the low noise amplifier 39.

On the other hand, when in receiving, output terminal of the RF switch 35 is connected with B terminal side, and input terminal of the RF switch 37 is connected with B terminal side. In this situation, RF signal received by the antenna 31 is inputted from A terminal of the three terminal circulator 32 and is outputted from B terminal of that, and is inputted into the low noise amplifier 39. Receiving RF signal amplified by the low noise amplifier 39 becomes maximum gain mode by being outputted to A terminal through B terminal of RF switch 37. Signal outputted from A terminal of RF switch 37 is signal processed in receiving circuit 40, for example, for image display.

And, while receiving radar signal, receiving signal is gradually growing larger, signal inputted in the receiving circuit 30 becomes large as the target of the radar approaches the radar and finally reaches to saturated state. Therefore, a function for detecting excessively large receiving signals, is provided.

When such an excessively large receiving signal enters in A terminal of the three terminal circulator 32, the receiving circuit 40 detects it and controls the RF switches 35, 37. If an excessively large receiving signal enters in A terminal of the three terminal circulator 32 while receiving radar signal, amplifying the receiving signal with the low noise amplifier 39 is not necessary. Therefore, output terminal of RF switch 35 is connected with C terminal side, and input terminal of RF switch 37 is connected with C terminal side. By this situation, receiving RF signal enters into the fixed attenuator 38 from RF switch 35, and is attenuated, is outputted from A terminal of RF switch 37, is inputted in the receiving circuit, without going through the low noise amplifier 39. Therefore, saturation of the low noise amplifier 39 can be fully prevented.

As mentioned above, the transmitting-receiving module according to the embodiment of the present invention can decrease the number of RF switch 35 which lies between the circulator 32 and the low noise amplifier 39 to only one with maintaining receiving system function. Therefore, assuming the loss of the RF switch is 0.5 dB, the loss in receiving system can be improved by about 1 dB by eliminating two RF switches.

The decrease of RF switch contributes greatly to improvement of noise figure, besides it makes possible of miniaturizing the whole circuit because one RF switch and terminating resistance become unnecessary compared with the conventional one.

The present invention is not limited to the above-mentioned embodiment, but can be used with a variety of modifications within the scope of the technical thoughts.

What is claimed is:

1. A transmitting-receiving module of a radar system comprising:
   a transmitting circuit for sending an RF signal;
   a three terminal circulator having a first terminal connected to a transmitting-receiving antenna which transmits the RF signal sent from the transmitting circuit and receives an RF signal which is a reflected wave of the RF signal, a second terminal to which is input a signal received by the transmitting-receiving antenna, and a third terminal connected to the transmitting circuit;
   a first RF switch which is connected with the second terminal of the three terminal circulator and which has two outputs;
   a second RF switch with two inputs;
   an attenuator connected between one output of the first RF switch and one input of the second RF switch; and
   a receiving circuit connected with the output terminal of the second RF switch, wherein
   during radar signal transmission, the first RF switch is connected with the attenuator, the second RF switch is not connected with the attenuator; and
   during radar signal reception, the first RF switch is connected with the second RF switch through one of a direct connection or through a low noise amplifier.

2. A transmitting-receiving module of a radar system according to claim 1, wherein
   if the receiving circuit detects the signal received by the transmitting-receiving antenna is larger than a predetermined level when receiving the radar signal, the first RF switch is connected with one end of the attenuator, and the second RF switch is connected with another end of the attenuator.

3. A transmitting-receiving module of a radar system comprising:
   a transmitting circuit for sending an RF signal;
   a three terminal circulator having a first terminal connected to a transmitting-receiving antenna which transmits an RF signal sent from the transmitting circuit and receives an RF signal which is a reflected wave of the transmitted RF signal, a second terminal to which is input a signal received by the transmitting-receiving antenna, and a third terminal connected to the transmitting circuit;
   a 1-input 2-output first RF switch which is connected with the second terminal of the three terminal circulator;
   a 2-input 1-output second RF switch the first input terminal of which is connected with the first output terminal of the first RF switch;

an attenuator having one end connected with the second output terminal of the first RF switch and another end connected with the second input terminal of the second RF switch;

a low noise amplifier having an input terminal connected with the output terminal of the second RF switch; and a receiving circuit having an input which is the output of the low noise amplifier, wherein during radar signal transmission, the input terminal of the first RF switch is connected with the second output terminal of the first RF switch, the output terminal of the second RF switch is connected with the first input terminal of the second switch; and during radar signal reception, the input terminal of the first RF switch is connected with the first output terminal of the first RF switch, the output terminal of the second RF switch is connected with the first input terminal of the second RF switch.

4. A transmitting-receiving module of a radar system according to claim 3, wherein if the receiving circuit detects the signal is larger than a predetermined level when receiving the radar signal, the input terminal of the first RF switch is connected with the second output terminal of the first RF switch, and the output terminal of the second RF switch is connected with the second input terminal of the second RF switch.

5. A transmitting-receiving module of a radar system comprising:

a transmitting circuit for sending an RF signal;

a three terminal circulator having a first terminal connected to a transmitting-receiving antenna which transmits the RF signal sent from the transmitting circuit and receives the RF signal which is a reflected wave of the RF signal, a second terminal to which is input a signal received by the transmitting-receiving antenna, and a third terminal connected to the transmitting circuit;

a 1-input 2-output first RF switch which is connected with the second terminal of the three terminal circulator and which has two outputs a low noise amplifier the input terminal of which is connected with the first output terminal of the first RF switch;

an attenuator one end of which is connected with the second output terminal of the first RF switch;

a 2-input 1-output second RF switch the first input terminal of which is connected with the output terminal of the low noise amplifier, and the second input terminal of which is connected with another end of the attenuator; and a receiving circuit connected with the output terminal of the second RF switch, wherein during radar signal transmission, the input terminal of the first RF switch is connected with the second output terminal of the first RF switch, the output terminal of the second RF switch is connected with the first input terminal of the second RF switch; and during radar signal reception, the input terminal of the first RF switch is connected with the first output terminal of the first RF switch, the output terminal of the second RF switch being connected with the first input terminal of the second RF switch.

6. A transmitting-receiving module of a radar system according to claim 5, wherein if the receiving circuit detects the receiving signal received by the transmitting-receiving antenna is larger than a predetermined level when receiving the radar signal, the input terminal of the first RF switch is connected with the second input terminal of the first RF switch and the output terminal of the second RF switch is connected with the first input terminal of the second RF switch.

7. A transmitting-receiving module of a radar system comprising:

a transmitting circuit for sending an RF signal;

a transmitting-receiving antenna which transmits the RF signal sent out from the transmitting circuit and receives the RF signal which is a reflected wave of the transmitted RF signal;

a three terminal circulator having a first terminal connected to the transmitting-receiving antenna, a second terminal to which is input a signal received by the transmitting-receiving antenna, and a third terminal connected to the transmitting circuit;

a first RF switch connected with the second terminal of the three terminal circulator and which has two outputs;

a second RF switch having two inputs;

an attenuator connected between the first RF switch and the second switch; and a receiving circuit connected with the output terminal of the second RF switch, wherein during radar signal transmission, the first RF switch is connected with the attenuator, and the second RF switch is not connected with the attenuator, and during radar signal reception, the first RF switch is connected with the second RF switch through one of a connection or a low noise amplifier.

8. A transmitting-receiving module of radar system according to claim 7, wherein if the receiving circuit detects the receiving signal is larger than a predetermined level when receiving the radar signal, the first RF switch is connected with one end of the attenuator and the second RF switch is connected with another end of the attenuator.

* * * * *